United States Patent
Wang et al.

(10) Patent No.: US 8,532,450 B1
(45) Date of Patent: Sep. 10, 2013

(54) OPTICAL GRATING AND METHOD OF MANUFACTURE

(75) Inventors: Zhongyan Wang, San Ramon, CA (US); Wei Gao, Fremont, CA (US); Ruolin Li, Milpitas, CA (US); HongXing Yuan, Fremont, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 361 days.

(21) Appl. No.: 12/645,491

(22) Filed: Dec. 23, 2009

(51) Int. Cl.
    *G02F 1/295* (2006.01)
(52) U.S. Cl.
    USPC .................................. 385/37; 385/10
(58) Field of Classification Search
    None
    See application file for complete search history.

(56) References Cited

U.S. PATENT DOCUMENTS

| | | | |
|---|---|---|---|
| 6,545,808 B1 * | 4/2003 | Ehbets et al. | 359/566 |
| 7,203,387 B2 | 4/2007 | Doan | |
| 7,349,614 B2 | 3/2008 | Doan | |
| 7,554,734 B1 | 6/2009 | Holm | |
| 8,320,722 B1 * | 11/2012 | Yuan et al. | 385/37 |
| 2007/0070276 A1 | 3/2007 | Tan | |
| 2007/0159720 A1 | 7/2007 | Sohn | |
| 2007/0165495 A1 | 7/2007 | Lee | |
| 2008/0043360 A1 | 2/2008 | Shimazawa | |
| 2009/0053655 A1 | 2/2009 | Deng | |
| 2009/0188891 A1 | 7/2009 | Tanaka | |
| 2009/0190458 A1 | 7/2009 | Nashi | |

* cited by examiner

*Primary Examiner* — Tina Wong

(57) ABSTRACT

A method and system for providing an optical grating are described. The optical grating is configured for light of a wavelength and includes a first optically transparent layer, a stop layer on the first optically transparent layer, and a second optically transparent layer on the stop layer. The first optically transparent layer is continuous and includes a material. The second optically transparent layer also includes the material. The second optically transparent layer also includes a plurality of discrete ridges spaced apart by a pitch. The stop layer is configured to be invisible to the light.

21 Claims, 6 Drawing Sheets

OPTICAL GRATING AND METHOD OF MANUFACTURE

BACKGROUND

Optical gratings are used for light coupling and delivery in a variety of optical systems. For example, in energy assisted magnetic recording (EAMR) electromagnetic radiation (light) is provided from a laser to a grating. Typically, the light provided from the laser is in the optical range of the spectrum. The grating is configured for a particular wavelength in the spectrum. Typically this means that the grating actually functions in a range of wavelengths around the particular wavelength. The grating couples light of the particular wavelength from the laser to a waveguide. The light from the waveguide is typically provided to a near-field transducer (NFT) and used to heat a spot on a magnetic recording media. Data is magnetically written to the spot while the spot is heated.

The coupling efficiency of a grating is a measure of the losses in optical energy between light input to the grating and light output by the grating. A higher coupling efficiency translates to lower losses in the grating. Thus, a higher coupling efficiency is desired. In order to achieve high coupling efficiency in a grating, the geometry of the grating, such as the pitch, depth, and shape of ridges in the grating are closely controlled. Thus, fabrication of a grating includes controls of such features.

FIG. 1 depicts a conventional method 10 for fabricating a conventional grating. The core materials, such as $Ta_2O_5$ are deposited, via step 12. A photoresist mask is provided on the core material, via step 14. The photoresist mask has a series of lines interleaved with apertures. The core material is etched, via step 16. Thus, the pattern of the photoresist mask is transferred to the core material.

Although the conventional method 10 may be used, there may be drawbacks. FIG. 2 depicts a conventional grating 50 having a pitch, d. The conventional grating 50 includes core material 54 on a substrate 52. The core material 54 includes a plurality of ridges, such as the ridge 62, interleaved with troughs, such as the troughs 64, 66, and 68. Also shown is a photoresist mask 56 used in fabricating the grating 50. The photoresist mask 56 includes lines 58 interleaved with apertures 60 at the pitch, d. The geometry of the conventional grating 50 may differ from what is desired. More specifically, as can be seen in FIG. 2, the troughs differ. For example, troughs 64, 66, and 68 differ in width, depth, and profile. Further, the depth of the troughs that are achievable may be limited by the pitch of the conventional grating 50. Such differences in the troughs may adversely affect performance of the conventional grating 50. More specifically, the optical efficiency of the conventional grating 50 may degrade.

Accordingly, what is needed is an improved method for fabricating a grating.

BRIEF SUMMARY OF THE INVENTION

A method providing an optical grating is described. The optical grating is configured for light of a wavelength and includes a first optically transparent layer, a stop layer on the first optically transparent layer, and a second optically transparent layer on the stop layer. The first optically transparent layer is continuous and includes a material. The second optically transparent layer also includes the material. The second optically transparent layer also includes a plurality of discrete ridges spaced apart by a pitch. The stop layer is configured to be invisible to the light.

DETAILED DESCRIPTION OF THE EMBODIMENTS OF THE INVENTION

Figure 1:
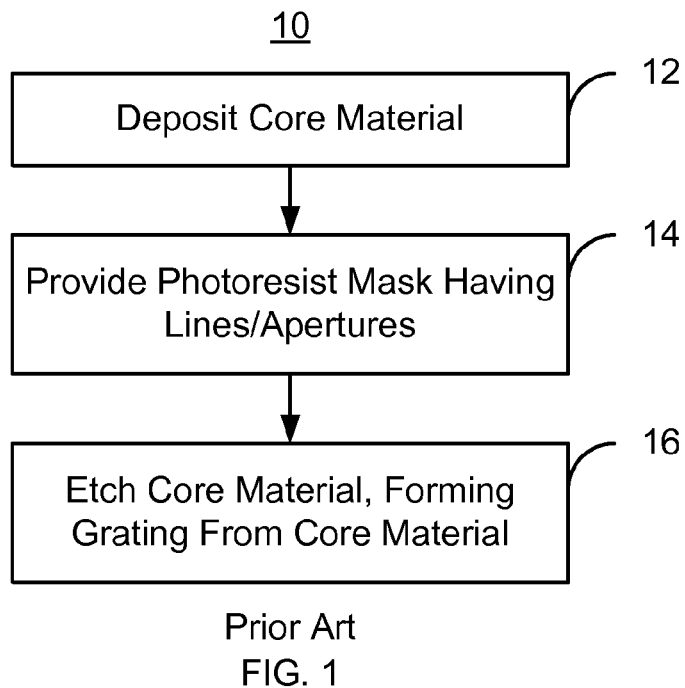
FIG. 1 is a flow chart depicting a conventional method for fabricating an optical grating.
Figure 2:
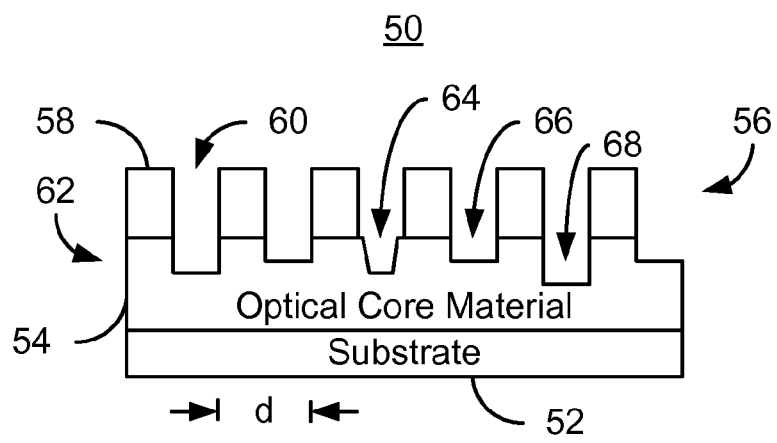
FIG. 2 is a diagram depicting a conventional grating.
Figure 3:
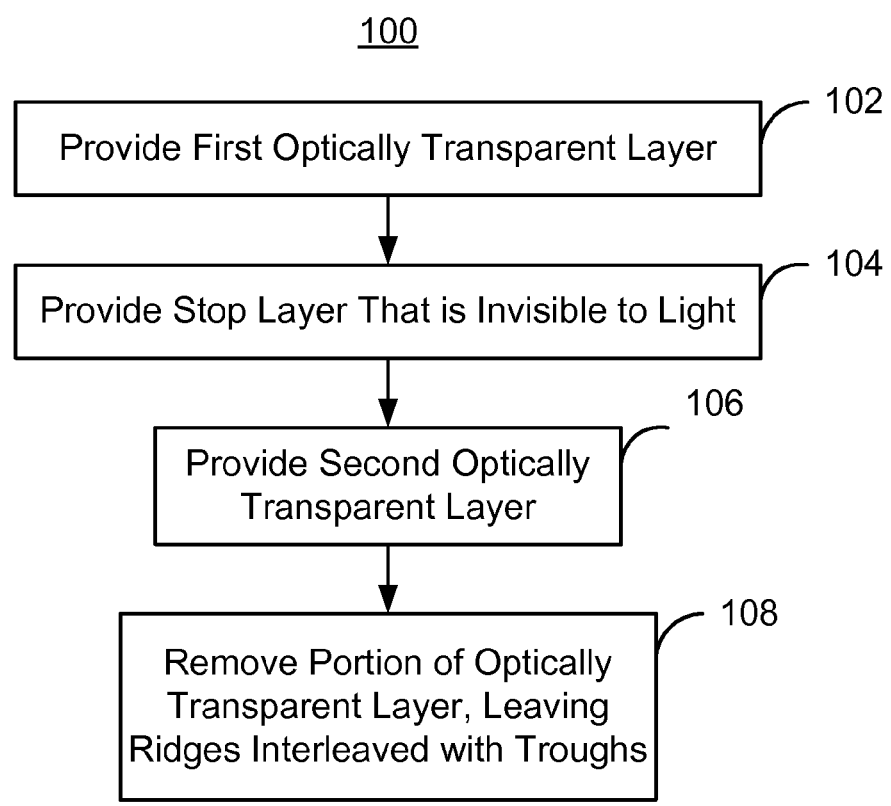
FIG. 3 is a flow chart depicting an exemplary embodiment of a method for fabricating a grating.

FIG. 3 is a flow chart depicting an exemplary embodiment of a method 100 for fabricating a grating. Although certain steps are shown, some steps may be omitted, interleaved, and/or combined. The grating being fabricated may be used in an optical system such as EAMR head that resides on a slider (not shown) in a disk drive. Thus, the method 100 may be part of a method used in fabricating an EAMR head. The method 100 also may commence after formation of other portions of the EAMR head. The method 100 is also described in the context of providing a single grating. However, the method 100 may be used to fabricate multiple gratings at substantially the same time. The method 100 and system are also described in the context of particular layers. However, in some embodiments, such layers may include multiple sub-layers. The grating fabricated using the method 100 is configured for a particular wavelength. Thus, the grating operates for light in a range around the wavelength. For example, in one embodiment, the grating being fabricated is configured for 850 nm light. In other embodiments, the wavelength may differ. For example, gratings for wavelengths of nine hundred nanometers or more might be fabricated.

A first optically transparent layer is provided, via step 102. The optically transparent layer may include materials such as those used for the core of a waveguide. For example, the optically transparent layer may include tantalum oxide (e.g. $Ta_2O_5$). The thickness of the first optically transparent layer depends upon the total thickness of the components to which the light is to be coupled. In some embodiments, the total thickness of the grating is desired to be on the order of one hundred fifty nanometers. Thus, the first optically transparent layer may be at least forty nanometers and not more than eighty nanometers.

A stop layer is provided on the first optically transparent layer, via step 104. The stop layer provided in step 104 is configured to be invisible to the light with which the grating is desired operate. In some embodiments, therefore, the stop layer is not more than ten percent of the wavelength of the light for which the grating is configured. In many embodiments, the stop layer is significantly thinner than ten percent of the wavelength. For example, for a grating configured for 850 nm light, the stop layer may be at least one and not more than twenty-five nanometers. In some such embodiments, the stop layer may be at least one and not more than fifteen nanometers. Thus, the stop layer is sufficiently thin that the stop layer does not adversely affect the performance of the grating. In some embodiments, the stop layer has an index of refraction and a dielectric constant configured to confine the light in at least one of the first optically transparent layer and the second optically transparent layer. In some embodiments, the stop layer includes aluminum oxide.

A second optically transparent layer is provided on the stop layer, via step 106. The second optically transparent layer includes the material that is also used in the first optically transparent layer. Thus, the second optically transparent layer provided in step 106 may include core materials such as tantalum oxide. In some embodiments, the second optically transparent layer consists of the material. Thus, the first and second optically transparent layers may have identical compositions. The second optically transparent layer may also have a thickness desired for the ridges of the grating being formed. In some embodiments, the thickness of the second optically transparent layer is at least fifty and not more than one hundred nanometers.

A portion of the second optically transparent layer is removed via a removal process, via step 108. The stop layer provided in step 104 is a stop for the removal process used in step 108. Step 108 may include forming a mask having lines interleaved with apertures, then etching the second optically transparent layer with the mask in place. Thus, a plurality of discrete ridges interleaved with a plurality of troughs are formed in the second optically transparent layer. The discrete ridges spaced apart by a pitch. In some embodiments, the pitch is constant throughout the grating. In other embodiments, the pitch varies across the grating. Thus, a nonlinear grating may be formed. Because of the presence of the stop layer, the ridges formed by the removal process in step 108 have a maximum height substantially the same as the thickness of the second optically transparent layer.

Figure 4:
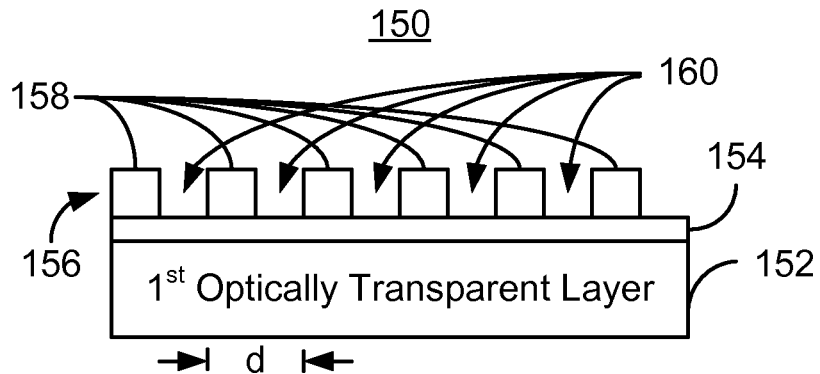
FIG. 4 is a diagram depicting an exemplary embodiment of an optical grating

FIG. 4 is a diagram depicting an exemplary embodiment of an optical grating 150 formed using the method 100. For simplicity, FIG. 4 is not to scale. The optical grating 150 includes a first optically transparent layer 152, a stop layer 154, and a second optically transparent layer 156. The second optically transparent layer 156 has been etched to form a series of ridges 158 interleaved with troughs 160. The troughs 160 are depicted as extending through the second optically transparent layer 156 to the stop layer 154. However, in some embodiments, the troughs 160 may terminate in another layer, for example within the second optically transparent layer 156. The grating 150 has a pitch, d, that is constant across the grating 150.

Figure 5:
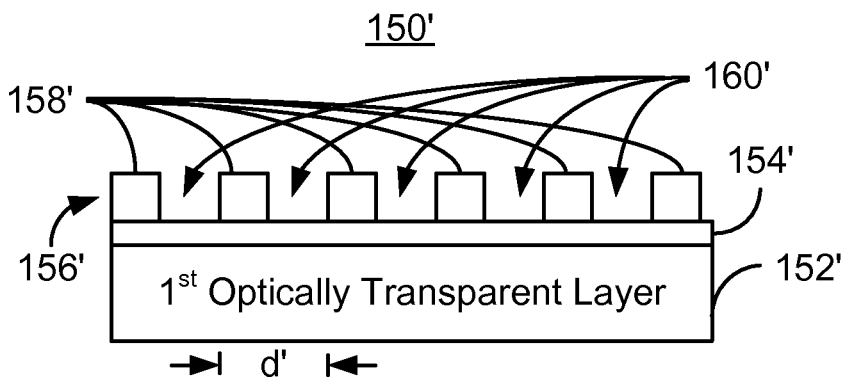
FIG. 5 is a diagram depicting another exemplary embodiment of an optical grating.

FIG. 5 is a diagram depicting an exemplary embodiment of an optical grating 150' formed using the method 100. For simplicity, FIG. 5 is not to scale. The grating 150' is analogous to the grating 150. Consequently, analogous components are labeled similarly. The optical grating 150' thus includes a first optically transparent layer 152', a stop layer 154', and a second optically transparent layer 156' having ridges 158' interleaved with troughs 160'. The troughs 160' are depicted as extending through the second optically transparent layer 156' to the stop layer 154'. However, in some embodiments, the troughs 160' may terminate in another layer, for example within the second optically transparent layer 156'. The grating 150' has a pitch d' different from that of the grating 150. However, the heights of the ridges 158' are substantially the same as for the ridges 158 of the grating 150.

Figure 6:
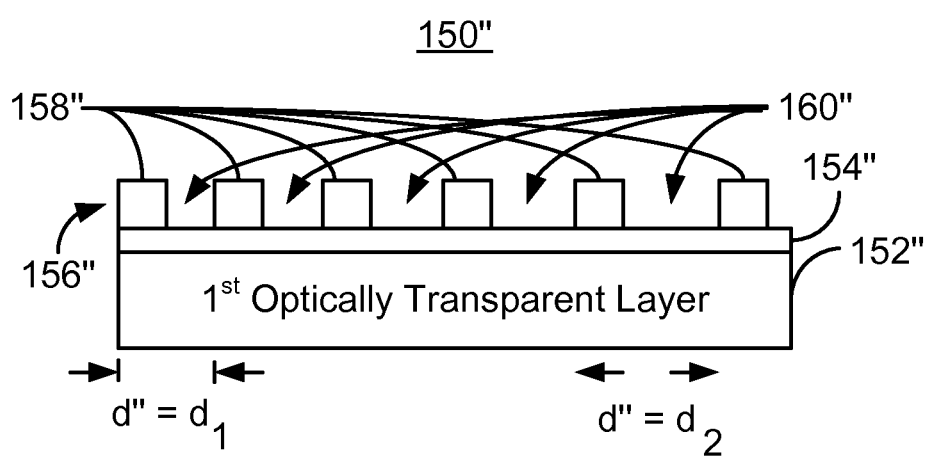
FIG. 6 is a diagram depicting another exemplary embodiment of an optical grating.

FIG. 6 is a diagram depicting an exemplary embodiment of an optical grating 150" that is also formed using the method 100. For simplicity, FIG. 6 is not to scale. The grating 150" is analogous to the grating 150. Consequently, analogous components are labeled similarly. The optical grating 150" thus includes a first optically transparent layer 152", a stop layer 154", and a second optically transparent layer 156" having ridges 158" interleaved with troughs 160". The troughs 160" are depicted as extending through the second optically transparent layer 156" to the stop layer 154". However, in some embodiments, the troughs 160" may terminate in another layer, for example within the second optically transparent layer 156". The grating 150" has a pitch, d", that varies. Consequently, one end of the grating 150' has a pitch $d"=d_1$, while the other end of the grating has a pitch $d"=d_2$. Although a particular variation is shown for the pitch d", in other embodiments, the pitch may vary in another manner.

Using the method 100, gratings 150/150'/150" may be provided. More specifically, the method 100 decouples the pitch of the gratings 150/150'/150" from the height of the ridges 158/158'/158". The pitch is also decoupled from the depths of the troughs 160/160'/160". The maximum height of the ridges 158/158'/158" may be controlled by the thickness of the second optically transparent layer 156/156'/156" and thus the position of the stop layer 154/154'/154". However, the pitch is controlled by the distance between apertures in a mask used in step 108. Thus, gratings 150/150'/150" having the same height of the ridges 158/158'/158" may have different pitches d, d', and d", respectively. Further, a nonlinear grating 150" having a varying pitch may also be provided. Thus, the flexibility of the gratings 150/150'/150" provided via the method 100 may be improved. Moreover, because the desired pitch and height of the ridges 158/158'/158" may be provided, the geometries of the gratings 150/150'/150" are closer to that which is desired for a particular wavelength. As a result, the method 100 results in gratings 150/150'/150" that may have improved optical efficiency. This flexibility and improved optical efficiency may be provided without the stop layer 154/154'/154" adversely affecting performance of the gratings 150/150'/150". This benefit is provided because the stop layer 154/154'/154" is configured to be invisible to the light used with the gratings 150/150'/150". Moreover, because the stop layer 154/154'/154" is a stop for the removal process that forms the ridges 158/158'/158" and troughs 160/160'/160", the yield for the method 100 may be improved. Thus, manufacturability as well as performance of the gratings 150/150'/150" may be improved. In addition, the method 100 may be extended to other optical components. For example, channel waveguides, optical mode converters, tapered waveguides and solid immersion mirrors are among the components that might be so fabricated. For such devices, structures of a stop layer sandwiched between optically transparent layers and use of the removal of an outer layer terminated by the stop layer may provide the desired geometry of the structure being formed.

Figure 7:
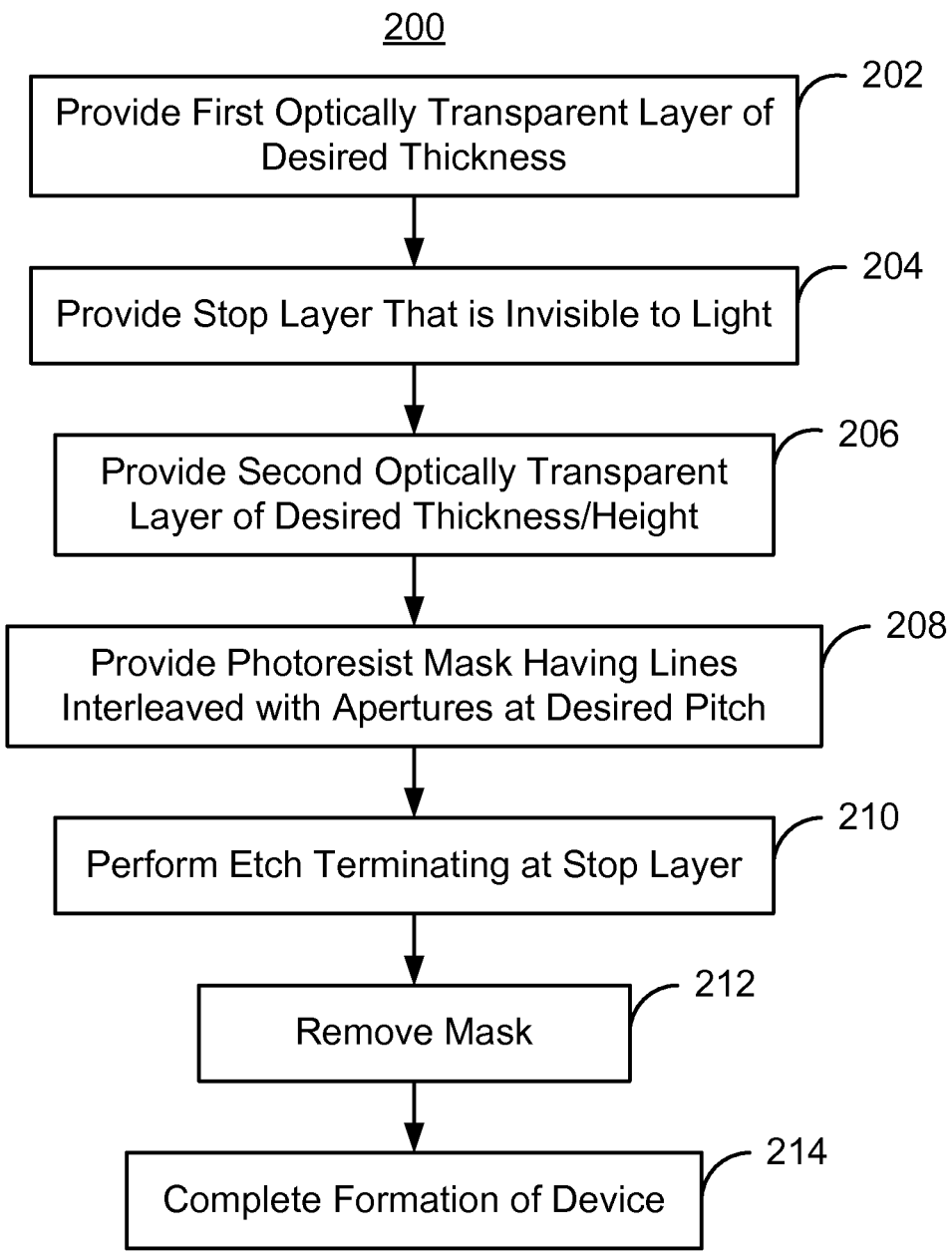
FIG. 7 is a flow chart depicting another exemplary embodiment of a method for fabricating an optical grating.

FIG. 7 is a flow chart depicting another exemplary embodiment of a method 200 for fabricating an optical grating. Although certain steps are shown, some steps may be omitted, interleaved, or combined. FIGS. 8-11 are diagrams depicting side views of an exemplary embodiment of a portion of an optical grating 250 during fabrication. For clarity, FIGS. 8-11 are not to scale. Referring to FIGS. 7-11, the method 200 is described in the context of the grating 250. However, the method 200 may be used to form another device (not shown). Further, the method 200 may be part of another method used in forming an EAMR head. The method 200 may thus commence after formation of other portions of the EAMR transducer of which the grating 250 is part. The method 200 is also described in the context of providing a single grating 250. However, the method 200 may be used to fabricate multiple gratings at substantially the same time. The method 200 and grating 250 are also described in the context of particular layers. However, in some embodiments, such layers may include multiple sublayers. Further, the grating fabricated using the method 200 is configured for a particular wavelength. Thus, the grating operates for light in a range around the wavelength. For example, in one embodiment, the grating being fabricated is configured for 850 nm light. In other embodiments, the wavelength may be different.

A first optically transparent layer is provided, via step 202. The optically transparent layer may include materials such as those used for the core of a waveguide. For example, the optically transparent layer may include tantalum oxide. The thickness of the first optically transparent layer depends upon the total thickness of the components to which the light is to be coupled.

A stop layer is provided on the first optically transparent layer, via step 204. The stop layer is a stop for a removal process, described below. In some embodiments, the stop layer includes alumina. The stop layer provided in step 204 is also desired to leave performance of the grating being formed substantially unaffected. Thus, the stop layer is configured to be invisible to the light with which the grating is desired operate. In some embodiments, the stop layer has an index of refraction and a dielectric constant configured to confine the light in at least one of the first optically transparent layer and the second optically transparent layer. For example, the index of refraction of the stop layer may be approximately 1.65.

A second optically transparent layer is provided on the stop layer, via step 206. The second optically transparent layer includes the material that is also used in the first optically transparent layer. Thus, the second optically transparent layer provided in step 206 may include core materials such as tantalum oxide. In some embodiments, the first optically transparent layer and the second optically transparent layer consists of the material. For example, both the first optically transparent layer and the second optically transparent layer may consist of tantalum oxide.

Figure 8:
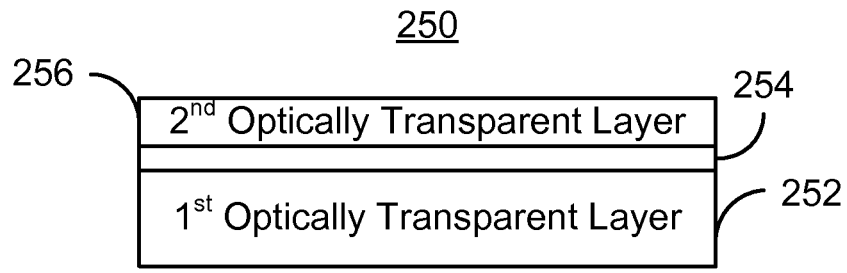
FIGS. 8-11 are diagrams depicting an exemplary embodiment of a grating during fabrication.

FIG. 8 depicts the grating 250 after step 206 is performed. Thus, the first optically transparent layer 252, the stop layer 254, and the second optically transparent layer 256 are shown. Not shown are layers under the first optically transparent layer 252, such as a substrate or other structures. In some embodiments, the first optically transparent layer may be at least forty nanometers and not more than eighty nanometers. Thus, the stop layer 254 is configured to be invisible to the light with which the grating 250 is desired operate. In some embodiments, therefore, the stop layer 254 is not more than ten percent of the wavelength of the light for which the grating 250 is configured. In many embodiments, the stop layer 254 is significantly thinner than ten percent of the wavelength. For example, in some embodiments, the stop layer 254 may be at least one and not more than twenty-five nanometers. In some embodiments, the stop layer 254 may be at least one and not more than fifteen nanometers. In some such embodiments, the stop layer 254 is at least nine and not more than eleven nanometers thick. In some embodiments, the thickness of the second optically transparent layer 256 is substantially the same as the height of the ridges to be formed in the grating 250. In some embodiments, the thickness of the second optically transparent layer 256 is at least fifty nanometers and not more than one hundred nanometers.

Figure 9:
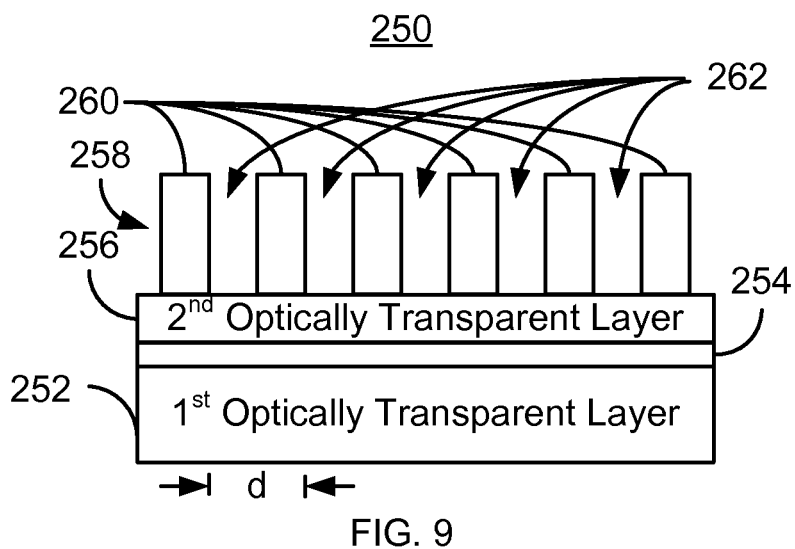

A mask including a plurality of lines interspersed with a plurality of apertures is provided, via step 208. The mask provided in step 208 is to be used in fabricating the ridges of the grating, as described below. FIG. 9 depicts the grating 250 after step 208 is performed. Thus, the mask 258 is shown. The mask 258 includes lines 260 interleaved with apertures 262. The apertures 262 expose a portion of the second optically transparent layer 256. The apertures 262/lines 260 are spaced apart by a pitch, d. In the embodiment shown, the pitch is constant across the grating. However, in other embodiments, the pitch may vary across the grating 250. Thus, a nonlinear grating may also be formed.

Figure 10:
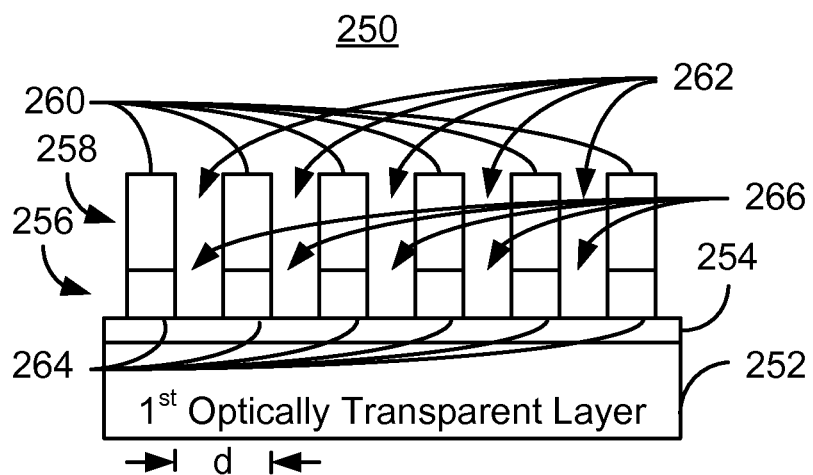

An etch of the material used for the second optically transparent layer 256 is performed, via step 210. The etch performed in step 210 terminates at or in the stop layer 254. Thus, the stop layer 254 is a stop layer for the etch performed in step 210. FIG. 10 depicts the grating 250 after step 210 is performed. Thus, discrete ridges 264 interleaved with troughs 266 have been formed in the second optically transparent layer 256. The pitch of the ridges 264/troughs 266, d, is substantially the same as the pitch of the lines 260/apertures 262 in the mask 258. Thus, the pitch of the grating 250 shown in FIGS. 8-11 is constant. However, in other embodiments, the pitch may vary. Further, as can be seen in FIG. 10, the bottoms of the troughs 266 are formed by the stop layer 254.

Figure 11:
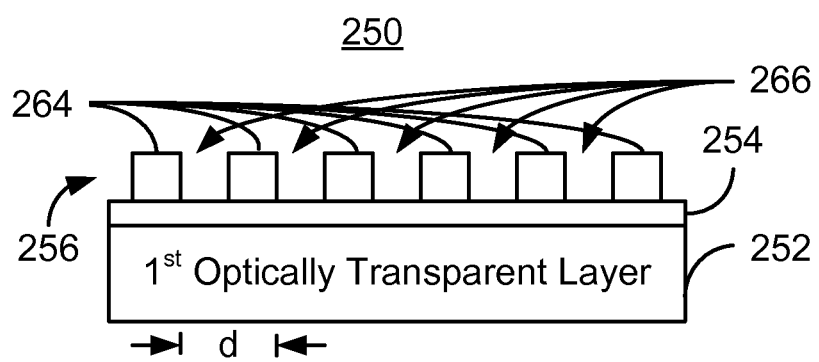

The mask 256 is removed, via step 212. For example, a photoresist strip may be performed in step 212. FIG. 11 depicts the grating 250 after step 212 is performed. Thus, the grating 250 including ridges 264 in the second optically transparent layer 256 is formed. The first optically transparent layer 252 remains continuous. Fabrication of the device may then be completed, via step 214. For example, other structures of the EAMR head or other device incorporating the grating 250 may be formed.

Using the method 200, the grating 250 may be provided. The method 200 and grating 250 share the benefits of the method 100 and gratings 150/150'/150". Thus, the method 200 decouples the spacing between the ridges 264, or pitch d, from the height of the ridges 264. As a result, a variety of gratings 250 having a variety of pitches and improved optical efficiency may be fabricated. Further, the method 200 may have improved yield.

We claim:

1. An optical grating configured for light of a wavelength, the optical grating comprising:
   a first optically transparent layer, the first optically transparent layer being continuous and including a material;
   a stop layer on the first optically transparent layer, the stop layer having a thickness of not more than ten percent of the wavelength such that the stop layer is invisible to the light; and
   a second optically transparent layer on the stop layer, the second optically transparent layer including the material and a plurality of discrete ridges spaced apart by a pitch.

2. The optical grating of claim 1 wherein the plurality of discrete ridges are interleaved with a plurality of troughs, each of the plurality of troughs having a bottom including a portion of the stop layer.

3. The optical grating of claim 1 wherein the thickness of the stop layer is not more than twenty five nanometers.

4. The optical grating of claim 3 wherein the thickness of the stop layer is at least one nanometer and not more than fifteen nanometers.

5. optical grating of claim 1 wherein the first optically transparent layer and the second optically transparent layer each consists essentially of the material.

6. The optical grating of claim 5 wherein the material is tantalum oxide.

7. The optical grating of claim 6 wherein the stop layer consists of aluminum oxide.

8. The optical grating of claim 1 wherein the second optically transparent layer is removable using an etch, the stop layer being an etch stop layer for the etch.

9. The optical grating of claim 1 wherein the stop layer has an index of refraction and a dielectric constant configured to confine the light in at least one of the first optically transparent layer and the second optically transparent layer.

10. The optical grating of claim 1 wherein the pitch varies such that the optical grating is a nonlinear grating.

11. The optical grating of claim 1 wherein the pitch is constant.

12. A method for providing an optical grating configured for light a wavelength, the method comprising:
   providing a first optically transparent layer including a material;
   providing a stop layer on the first optically transparent layer, the stop layer having a thickness of not more than ten percent of the wavelength such that the stop layer is invisible to the light
   providing a second optically transparent layer on the stop layer, the second optically transparent layer including the material;
   removing a portion of the second optically transparent layer via a removal process, the stop layer being a stop for the removal process, the removal process leaving a plurality of discrete ridges interleaved with a plurality of troughs, the plurality of discrete ridges spaced apart by a pitch.

13. The method of claim 12 wherein each of the plurality of troughs has a bottom including a portion of the stop layer.

14. The method of claim 12 wherein the thickness is not more than twenty five nanometers.

15. The method of claim 14 wherein the thickness is at least one nanometer and not more than fifteen nanometers.

16. The method of claim 12 wherein the first optically transparent layer and the second optically transparent layer each consists essentially of the material.

17. The method of claim 15 wherein the material is tantalum oxide.

18. The method of claim 17 wherein the stop layer consists of aluminum oxide.

19. The method of claim 12 wherein the step of removing a portion of the second optically transparent layer further includes:
   providing a mask including a plurality of lines interspersed with a plurality of apertures, the plurality of apertures exposing the portion of the second optically transparent layer; and
   etching the portion of the second optically transparent layer to provide the plurality of discrete ridges, the etching terminating at the stop layer.

20. The method of claim 12 wherein the stop layer has an index of refraction and a dielectric constant configured to confine the light in at least one of the first optically transparent layer and the second optically transparent layer.

21. A method for providing an optical grating configured for light a wavelength, the method comprising:
   providing a first optically transparent layer including a material;
   providing a stop layer on the first optically transparent layer, the stop layer being configured to be invisible to the light
   providing a second optically transparent layer on the stop layer, the second optically transparent layer including the material;
   removing a portion of the second optically transparent layer via a removal process, the stop layer being a stop for the removal process, the removal process leaving a plurality of discrete ridges interleaved with a plurality of troughs, the plurality of discrete ridges spaced apart by a pitch, the step of removing a portion of the second optically transparent layer further including
      providing a mask including a plurality of lines interspersed with a plurality of apertures, the plurality of apertures exposing the portion of the second optically transparent layer; and
      etching the portion of the second optically transparent layer to provide the plurality of discrete ridges, the etching terminating at the stop layer; and
   wherein the second optically transparent layer has a first substantially uniform thickness and the mask has a second substantially uniform thickness.

\* \* \* \* \*